US 8,271,726 B2

(12) United States Patent
Haga

(10) Patent No.: US 8,271,726 B2
(45) Date of Patent: Sep. 18, 2012

(54) DATA STORAGE APPARATUS, IMAGE FORMING APPARATUS AND DATA DELETION METHOD

(75) Inventor: Tatsuyoshi Haga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 715 days.

(21) Appl. No.: 12/189,325

(22) Filed: Aug. 11, 2008

(65) Prior Publication Data

US 2009/0083347 A1 Mar. 26, 2009

(30) Foreign Application Priority Data

Sep. 12, 2007 (JP) ................. 2007-236331

(51) Int. Cl.
*G06F 12/00* (2006.01)
(52) U.S. Cl. ...................................... 711/114
(58) Field of Classification Search .................. None
See application file for complete search history.

(56) References Cited

U.S. PATENT DOCUMENTS

| 7,516,268 B2 * | 4/2009 | Hung ........................... 711/103 |
| 2004/0120004 A1 * | 6/2004 | Okamoto et al. ............ 358/1.15 |
| 2005/0219899 A1 * | 10/2005 | Kishi et al. ............... 365/185.11 |

FOREIGN PATENT DOCUMENTS

| JP | 2004-48452 A | 2/2004 |
| JP | 2004-120356 | 4/2004 |
| JP | 2004-363834 A | 12/2004 |
| JP | 2005-159550 A | 6/2005 |
| JP | 2005-284998 | 10/2005 |

OTHER PUBLICATIONS

JP 2005-284998 A, Oct. 13, 2005, English Translation.*
JP 2004-120356 A, Apr. 15, 2004, English Translation.*
Japanese Office Action dated Dec. 13, 2011 (and English translation thereof) in counterpart Japanese Application No. 2007-236331.

* cited by examiner

*Primary Examiner* — Duc Doan
(74) *Attorney, Agent, or Firm* — Holtz, Holtz, Goodman & Chick, PC

(57) ABSTRACT

A data storage apparatus having a plurality of hard disk drives, having: a deletion control section which executes complete deletion processes of the plurality of hard disk drives simultaneously; and a display control section to form a progress status display information of the complete deletion processes by the deletion control section, which display information represents all the progress statuses of the plurality of the hard disk drives, and to display the display information on a display section.

14 Claims, 9 Drawing Sheets

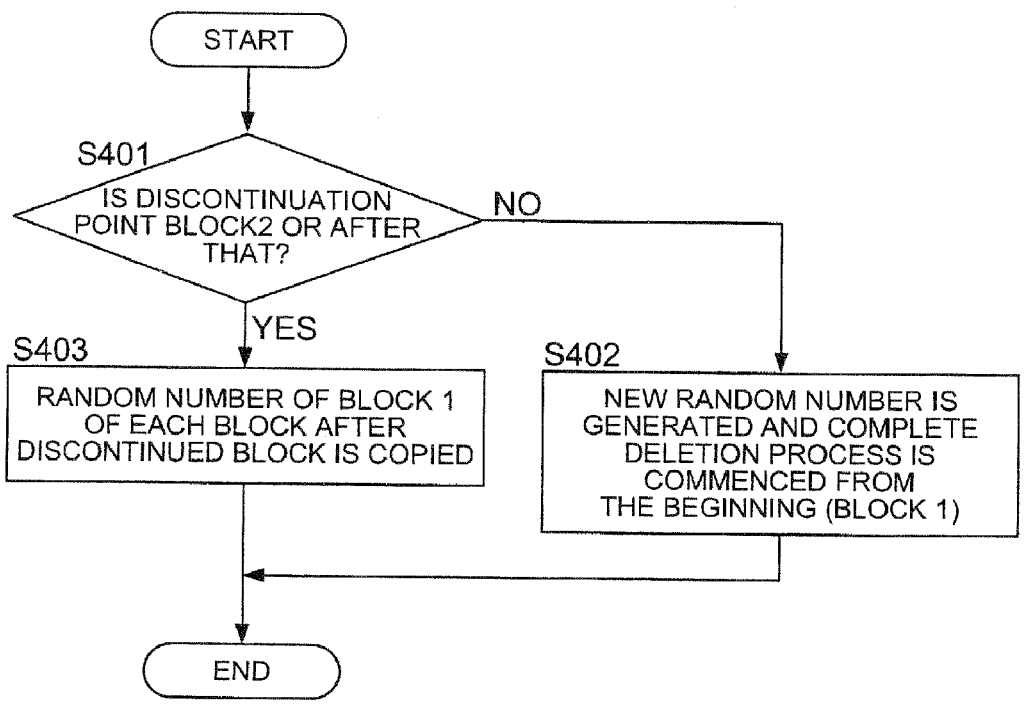

DATA STORAGE APPARATUS, IMAGE FORMING APPARATUS AND DATA DELETION METHOD

This application is based on Japanese Patent Application No. 2007-236331 filed on Sep. 12, 2007 in Japanese Patent Office, the entire content of which is hereby incorporated by reference.

BACKGROUND OF THE INVENTION

1. Technical Field

The present invention relates to a data storage apparatus provided with a plurality of hard disk drives, particularly relates to a data storage apparatus, which performs a complete deletion process of a storage area.

2. Description of the Related Arts

In order to prevent that confidential information is revealed from the data remaining in the hard disk drive, various data deleting methods are proposed. For example, there is an image processing apparatus aiming at the increase in efficiency of processing by performing deletion processing only for the field where still new data has not been overwritten among the fields into which data has been written (for example, refer to Unexamined Japanese Patent Application Publication No. 2005-159550). Further, there is a technology of altering a deleting method according to the type and importance of data, which has been written onto the medium (for example, refer to Unexamined Japanese Patent Application Publication No. 2004-363834). Further more, when discarding an image processing apparatus, such as a copying machine, due to purchasing a new one, there is an apparatus provided with the function which destroys data in the hard disk drive mounted in this apparatus based on the instruction from a user (for example, refer to Unexamined Japanese Patent Application Publication No. 2004-48452).

In the case of a hard disk drive, there is a possibility that former data which has been deleted once by fixed data is restored from the magnetic characteristic. Then, various safer deleting methods which are listed below have been proposed and have been standardized.

[Mode 1]

Standard: Russian standard method (GOST P50739-95), JEITA (Japan Electronics and Information Technology Industries Association) recommendation.

Contents: overwrite of 0x00, a number of STEPS: 1 time

[Mode 2]

Standard: U.S. National Security Agency method (NSA standard)

Contents: random number overwrite->random number overwrite->overwrite of 0x00, a number of STEPS: 3 times

[Mode 3]

Standard: U.S. computer security center method (NCSC-TG-025): U.S. Navy method (NAVSO P-5239-26): U.S. Department of Defense method (DoD 5220.22-M)

Contents: overwrite of 0x00->overwrite of 0xFF->random number overwrite->verification, a number of STEPS: 4 times

[Mode 4]

Standard: U.S. Army method (AR380-19)

Contents: random number overwrite->overwrite of 0x00->overwrite of 0xFF, a number of STEPS: 3 times

[Mode 5]

Standard: Old U.S. National Security Agency (NSA standard)

Contents: overwrite of 0x00->overwrite of 0xFF->overwrite of 0x00->overwrite of 0xFF, a number of STEPS: 4 times

[Mode 6]

Standard: North Atlantic Treaty Organization standard method (NATO method)

Contents: overwrite of 0x00->overwrite of 0xFF->overwrite of 0x00->overwrite of 0xFF->overwrite of 0x00->overwrite of 0xFF->random number overwrite, a number of STEPS: 7 times

[Mode 7]

Standard: German standard method (VSITR)

Contents: overwrite of 0x00->overwrite of 0xFF->overwrite of 0x00->overwrite of 0xFF->overwrite of 0x00->overwrite of 0xFF->overwrite of 0xAA, a number of STEPS: 7 times

[Mode 8]

Standard: U.S. Air Force method

Contents: overwrite of 0x00->overwrite of 0xFF->overwrite of 0x00->overwrite of 0xFF->overwrite of 0x00->overwrite of 0xFF->overwrite of 0xAA->verification, a number of STEPS: 8 times When exchanging or discarding hard disk drives, it is preferred to delete all the fields of a hard disk drive completely. However, as the capacity of a hard disk drive increases, the processing time for deleting all the fields once becomes long, and the case where it is needed for 1 hour or more is increasing in recent years. In order to improve security degree, when the complete deletion process which deletes the whole storage area in the above-mentioned [mode 8] is performed, for example, the long time of 8 times of a 1 (one)-time deletion will be required.

Further, there is also an apparatus provided with a plurality of hard disk drives. For example, in a color image processing apparatus, the hard disk drives for image data storage may be provided for respective colors. In case where an apparatus equips with a print controller as an option, the hard disk drive for storing font data, which is controlled by a print controller side CPU, may be provided other than the main body side hard disk drive for storing image data and stamp image for overlay, which is controlled by main body side CPU.

Thus, in case where the apparatus has a plurality of hard disk drives, when the apparatus performs one complete deletion process at a time individually, a very long processing time is necessary, which is calculated by multiplying the number of drives to the time which is necessary to carry out the complete delete per a hard drive. When deleting one set at a time individually, there was a problem that it was difficult to grasp managements of a deleted hard drive and an undeleted hard drive, the time required for performing complete deletion of all the hard disk drives and the progress status of work in the whole process.

Therefore, an object of the present invention is to provide a data storage apparatus, which is capable of performing a complete deletion of a plurality of hard drives with an easy and efficient management to solve the above-mentioned problem.

SUMMARY

According to one aspect of the invention, there is provided a data storage apparatus having: a deletion control section which executes complete deletion processes of the plurality of hard disk drives simultaneously; and a display control section to form a progress status display information of the complete deletion processes by the deletion control section, which display information represents all the progress statuses of the plurality of the hard disk drives, and to display the display information on a display section.

According to another aspect of the invention, there is provided an image forming apparatus comprising: a display section; a plurality of hard disk drives; a deletion control section which executes complete deletion processes of the plurality of hard disk drives simultaneously; and a display control section to form a progress status display information of the complete deletion processes by the deletion control section, which display information represents all the progress statuses of the plurality of the hard disk drives, and to display the display information on a display section.

According to still another aspect of the invention, there is provided a data deletion method for an image forming apparatus, which includes a plurality of hard disk drives, the method comprising: executing complete deletion processes of the plurality of hard disk drives simultaneously; forming a progress status display information of the complete deletion processes, which display information represents all the progress statuses of the plurality of the hard disk drives; and displaying the display information on a display section,

BRIEF DESCRIPTION OF THE DRAWINGS

FIG. 9 is a flow chart illustrating a resumption process after the complete deletion process by a random number writing is interrupted.

DETAILED DESCRIPTION OF THE PREFERRED EMBODIMENTS

Hereafter, an embodiment of the invention will be described based on drawings.

Figure 1:
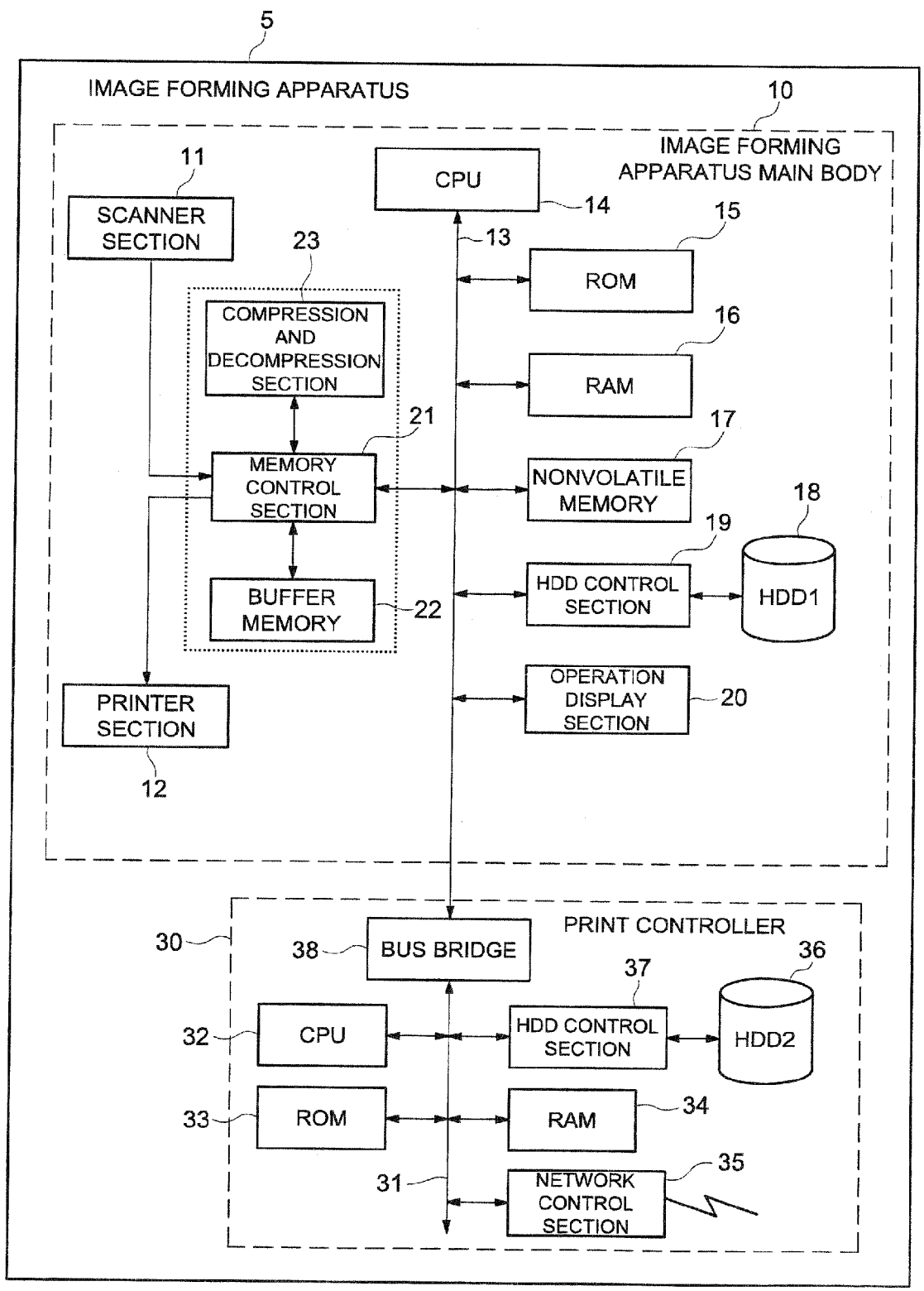
FIG. 1 is a block diagram illustrating the schematic diagram of an image forming apparatus provided with a data storage apparatus pertaining to an embodiment of the invention.

FIG. 1 illustrates a schematic diagram of an image forming apparatus 5 provided with a data storage apparatus pertaining to an embodiment of the present invention. The image forming apparatus 5 is configured as a digital multi-function machine provided with a copy function, which reads a document, forms a reproduced image onto a recording paper sheet and outputs it, and a printer function for performing a print operation based on the print data received from the external terminal. The image forming apparatus 5 comprises an image forming apparatus main body 10 and a print controller 30, which is attached onto an image forming apparatus main body 10 as an option.

The image forming apparatus main body 10 is provided with a scanner section 11, which reads a document and the printer section 12, which forms an image onto the recording paper sheet according to image data.

Although the inside of the scanner section 11 has not been shown in FIG. 1, the scanner section 11 includes a light source, which irradiates a document, a line image sensor, which reads a document by one line crosswise, a moving mechanism, which moves a reading position of a line unit in the length direction of the document and an optical element, which is configured by a lens and a mirror, which leads reflected lights from the document to the line image sensor to form an image. The line image sensor comprises a CCD (Charge Coupled Device), and is provided with an A/D converter, which changes the analog image signal outputted from the line image sensor into digital image data. Further, the scanner section 11 is provided with an automatic document feeder (not illustrated) for sequentially and continuously reading a plurality of documents.

The printer section 12 comprises a conveying apparatus for a recording paper sheet (not illustrated), a photoconductive drum, a charging apparatus, a laser unit, a development apparatus, a transfer separation apparatus, a cleaning apparatus and a fixing apparatus. The printer section 12 is configured as a printer engine of the laser method for forming an image on a recording paper sheet according to an electro photography process.

Further, the image forming apparatus main body 10 is configured so as to connect a CPU (Central Processing Unit) 14 for controlling the operation of the image forming apparatus main body 10, a ROM (Read Only Memory) 15, a RAM (Random Access Memory) 16, a nonvolatile memory 17, a HDD control section 19 for controlling reading, writing and data transfer of data to a hard disk drive 18 (HDD1) connected to the subordinate, an operation display control section 20 and a memory control section 21 with a system bus 13.

The program, which CPU 14 executes, and various kinds of fixed data have been stored in ROM 15. The RAM 16 is used as a work memory at the time when CPU 14 executes the program. The nonvolatile memory 17 is a semiconductor memory by which a memory content is held after turning power supply off, which memorizes a count value, such as a totaled copy number of paper sheets, various kinds of user information (including a user ID and a password) and the discontinuation information, which will be described later.

The magnetic disk drive, which can save large capacity of data, is used for as the hard disk drive 18. Another system, such as a magneto-optical disc may be used as the hard disk drives. The stamp image, which is overlaid on a document image besides image data is memorized by the hard disk drive 18. A read-out operation and a write-in operation of the data to the hard disk drive 18 via the HDD control section 19 are controlled by a CPU 14. The CPU 14 controls the storage area of the hard disk drive 18 with a file system, and image data is saved as a file in the hard disk drive 18.

The operation display control section 20 comprises a liquid crystal display, a touch panel formed on the surface of the liquid crystal and other operation switches. Various kinds of operation screens, a guide screen, a warning screen are displayed on a liquid crystal display. Various kinds of directions are received from a user through a touch panel or an operation switch.

A buffer memory 22, which temporarily saves image data, and a compression extension section 23, which compresses and expands image data, are connected to the subordinate of memory control section 21. A semiconductor memory, which is capable of being accessible at high speed, is used for the buffer memory 22.

The memory control section 21 achieves the function for controlling a write-in operation of the image data to a buffer memory 22, a read-out operation and an input-and-output operation of data to a compression extension section 23. The image data which the scanner section 11 outputs is inputted into the memory control section 21. The image data for print-outputs is supplied to the printer section 12 from the memory control section 21.

A print controller 30 is configured by a CPU 32, a ROM 33 and a RAM 34, a network control section 35, a HDD control section 37 by which a hard disk drive 36 (HDD2) is connected to the subordinate and bus bridge 38, which are connected to bus 31. The print controller 30 achieves a function, which rasterizes the print data received from an external terminal through the network, and develops the print data to image data.

A program and various kinds of fixed data are stored in the ROM 33. The CPU 32 realizes the functions of print controller 30 by executing programs stored in ROM 33 and performing various operation processing. The RAM 34 is used as a receiving buffer of the work memory at the time when the CPU 32 executes a program or an image memory by which print data and image data are developed.

Various kinds of font data which are used when rasterizing a character code is memorized in the hard disk drive 36. A read-out operation and a write-in operation of the data to the hard disk drive 36 via the HDD control section 37 are controlled by the CPU 32.

A network control section 35 achieves a communication function which transmits and receives various kinds of data via networks, such as an external terminal and LAN (Local Area Network). The bus 31 of the print controller 30 and the bus 13 of the image forming apparatus main body 10 are connected via a bus bridge 38. Various kinds of data is bi-directionally delivered and received between the image forming apparatus main body 10 and the print controller 30 through this bus bridge 38.

A copy function is achieved by simultaneously performing a reading operation which sequentially transmits image data to the hard disk drive 18 and temporarily saves and memorizes it into the buffer memory 22 after compressing the image data which has been read and obtained from a document by the scanner section 11, and a print output operation for sequentially outputting the image data to the printer section 12 through the memory control section 21 after reading the image data of a saved page from the hard disk drive 18 to the buffer memory 22 and expanding it in the compression extension section 23, in parallel.

In the printer function, the image data developed by the print controller 30 is once transmitted to the buffer memory 22 through the bus bridge 38, the bus 13 and the memory control section 21. The image data is sequentially outputted to the printer section 12 from this buffer memory 22 through memory control section 21 and is printed.

Next, a complete deletion process of a hard disk drive in the image forming apparatus 5 will be described. The complete deletion process which deletes the whole storage area is simultaneously performed to a plurality of hard disk drives 18 and 36. However, except for the time when an error occurs, various kinds of displays and reception of operations are performed as if one set of a hard disk drive conducts a complete deletion to a user.

Figure 2:
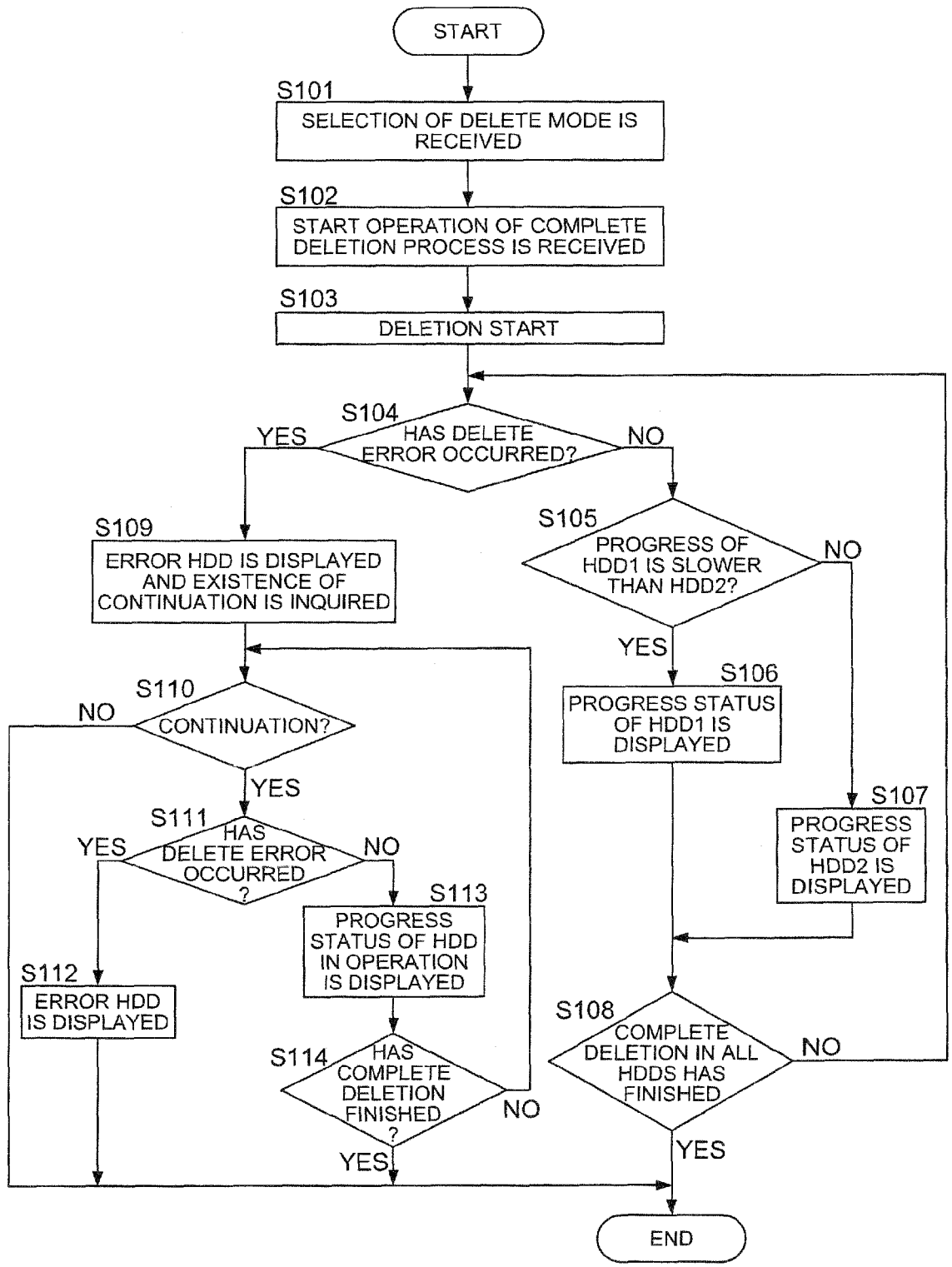
FIG. 2 is a flow chart illustrating the operation at the time when the image forming apparatus performs a complete deletion of a hard disk drive.

FIG. 2 illustrates the flow of the operation at the time when the image forming apparatus 5 performs a complete deletion (the whole storage area is deleted) with a hard disk drive. FIG. 2 illustrates the case where two sets, a hard disk drive 18 and a hard disk drive 36, are to be set as objects of the complete deletions. When a user performs a predetermined operation from an operation display control section 20, the complete deletion operation screens (not illustrated) will be displayed on the operation display control section 20. In a complete deletion operation screen, firstly, a selection operation of a DELETE MODE is received from a user (STEP S101). A plurality of modes chosen from [mode 1] to [mode 8], which was described and exampled in the background of this specification, and the other modes are prepared for the DELETE MODES in advance. The user can choose a proper DELETE MODE in consideration of importance of data and the time required of all the deletions, which are memorized by the hard disk drive.

After receiving selection of a DELETE MODE, a start instruction of a complete deletion is received (STEP S102). The start instructions are arranged not to be individually received to each hard disk drives 18 and 36, but the start instruction to a plurality of hard disk drives 18 and 36 is bundled into one start instruction and received. A user may be notified of the number and the discernment information on a hard disk drive, including a name and the number of the hard disk drive, to which a complete deletion is carried out with this start instruction. Further, It may be configured so that a user may not be notified that the complete deletion of a plurality of drives is carried out with one start instruction at all, or it may not be made conscious without notifying this discernment information.

When having received the start instruction, the complete deletion processes to a plurality of sets of hard disk drives 18 and 36 is simultaneously started according to the DELETE MODE previously specified (STEP S103). Here, CPU 14, which functions as a deletion control section, totally controls execution of the complete deletion process to the hard disk drive 18 in the image forming apparatus main body 10 side and a hard disk drive 36 in the print controller 30 side.

The CPU 14 transmits a predetermined command to a HDD control section 19, and, concretely, executes the complete deletion process of the hard disk drive 18 via the HDD control section 19. Further, the CPU 14 receives the information with respect to the progress status and error occurrence state from the HDD control section 19, and controls the hard disk drive 18. In parallel to this, further, the CPU 14 sends a predetermined message to the CPU 32 in the print controller 30 side through a bus bridge 38 and requests the complete deletion process of hard disk drive 36 to the CPU 32. The CPU 32 having received this request executes the complete deletion process of the hard disk drive 36 through a HDD control section 37. The CPU 32 receives the information with respect to the progress status and the error occurrence state of the complete deletion process of the hard disk drive 36 from HDD control section 37, and notifies this information to the CPU 14 via the bus bridge 38.

Figure 3:
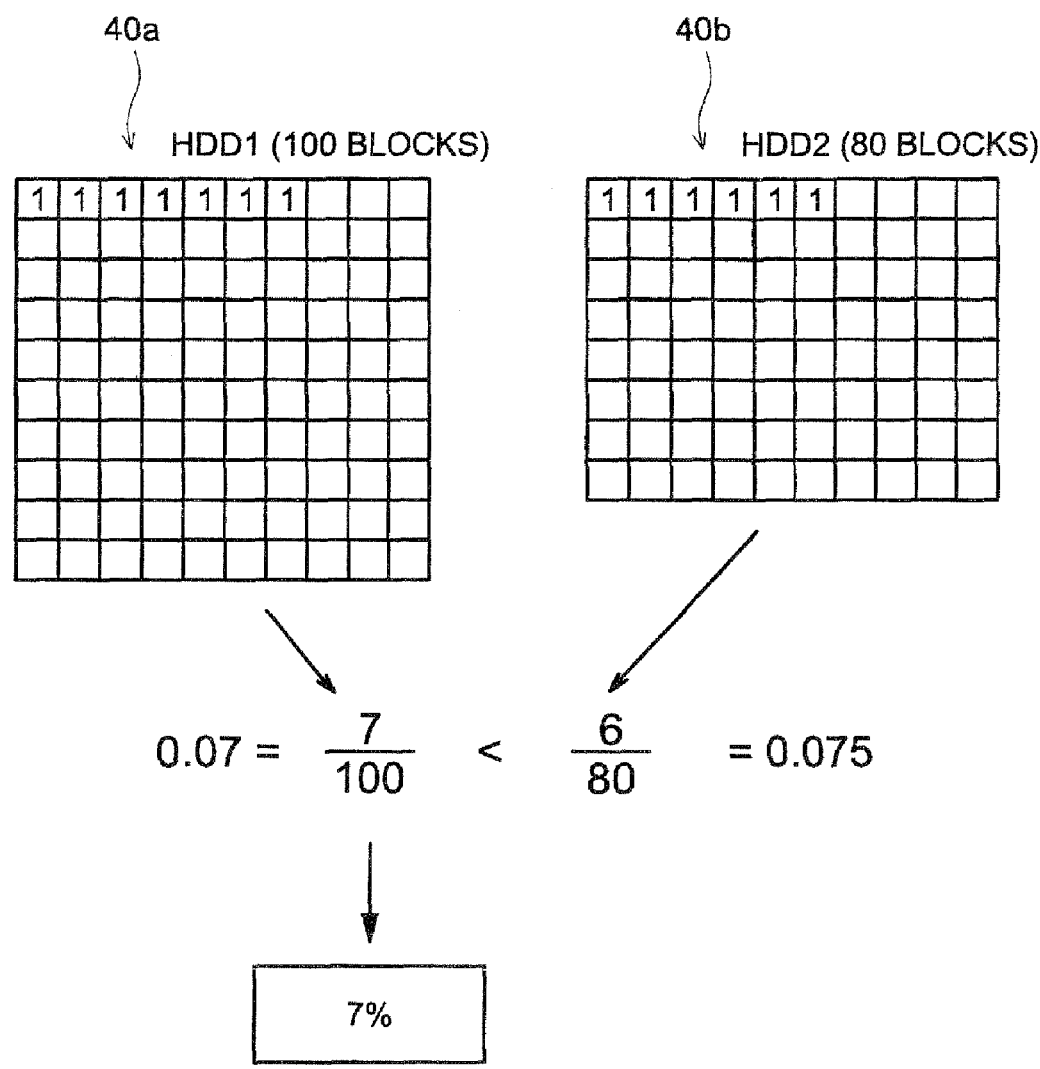
FIG. 3 is an explanatory view illustrating an example of a management table for controlling the progress status of complete deletion processes.

FIG. 3 illustrates an example of management tables 40a and 40b used in order that the CPU 14 may control the progress status of the complete deletion process in the hard disk drives 18 and 36. The management tables 40a and 40b are created according to the storage capacity for respective hard disk drives 18 and 36. It is supposed that the CPU 14 has known the hard disk drives 18 and 36, which are connected, and those capacities.

The complete deletion process of the hard disk drives 18 and 36 is performed by repeating deletion processing of a block unit (for example, 10 MB unit). The management tables 40a and 40b are the bit map tables respectively illustrating whether deletion processing of each block has been completed by 1 bit. In the example of FIG. 3, in order to make explanation simple, the hard disk drive 18 (HDD1) has 100 blocks and the hard disk drive 36 has 80 blocks. The bit of an upper left end corresponds to block 1, the bit position corresponding to the block proceeds rightward by a diagram as a block number progresses, and when it arrives at a right end, it is arranged so that it may fall by one step and may go to a right end from a left end again.

When the CPU 14 instructs the deletion processing for 1 block (10 MB) of the hard disk drive 18 to the HDD control section 19 and the CPU 14 has recognized the completion of this processing by an interrupt signal from HDD control section 19, the CPU 14 will set the corresponding bit in the management table 40*a* to "1."

Every time when the deletion processing for 1 block (10 MB) of the hard disk drive 36 completes, the CPU 32 notifies the CPU 14 that the block number at which the deletion processing has completed is notified, and the CPU 14 sets the corresponding bit in management table 40*b* to "1" according to this notice. Thus, the CPU 14 controls the progress status of the complete deletion process in the hard disk drive 18 and the hard disk drive 36.

In the example of FIG. 3, "1" has been set from a top to the 7th bit, and the deletion processing for 7 blocks has completed in the management table 40*a* of the hard disk drive 18. Therefore, the advance ratio (a deleted capacity/a total capacity amount) of a complete deletion process is obtained as following. Namely, ($7/100$)=0.07. On the other hand, "1" is set from the top to the 6th bit, and the deletion processing for 6 blocks has completed in the management table 40*b* of the hard disk drive 36. Therefore, the advance ratio of a complete deletion process is obtained as following. Namely ($6/80$)=0.075.

Returning to FIG. 2 and the explanation will be continued. The CPU 14 checks whether the error has been generated with hard disk drives 18 and 36 in the complete deletion process (STEP S104). In case where the error has not occurred (STEP S104; N), the progress status (advance ratio) of the complete deletion process in respective hard disk drives 18 and 36 is investigated and compared (STEP S105). And the CPU 14, which functions as a display control section, displays the progress status (advance ratio) of the hard disk drive of a slower progress status (an advance ratio is low) on the operation display control section 20 (STEP S106, S107).

In this example, in case where the progress status of the hard disk drive 18 (KDD1) is slower than the hard disk drive 36 (HDD2) (STEP S105; Y), the progress status of the hard disk drive 18 (HDD1) is displayed on the operation display control section 20 (STEP S106). In case where the progress status of the hard disk drive 18 (HDD1) is not slower than hard disk drive 36 (HDD2), (STEP S105; N), the progress status of the hard disk drive 36 (HDD2) will be displayed on the operation display control section 20 (STEP S107).

In the status of the management tables 40*a* and 40*b* illustrated in FIG. 3, since the progress status of the hard disk drive 18 is slower (an advance ratio is low), the progress status of the hard disk drive 18 is displayed on the operation display control section 20.

Figure 4:
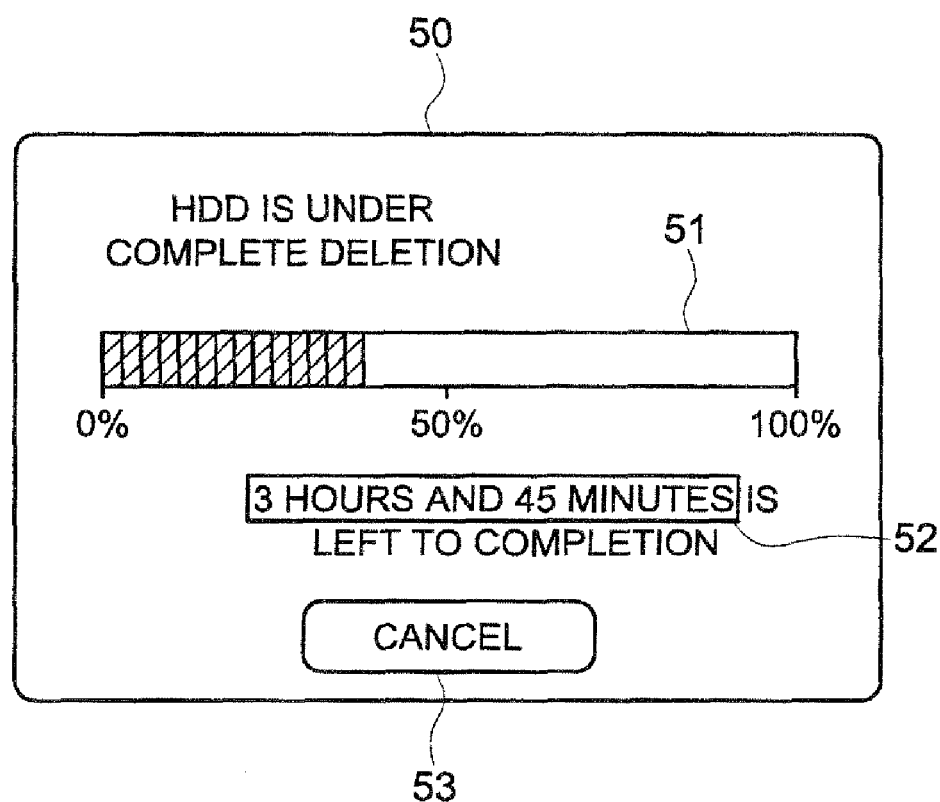
FIG. 4 is a front view illustrating an example of a progress status display screen.

FIG. 4 illustrates an example of a progress status display screen 50, which displays the progress status of a complete deletion process. The advance ratio of a hard disk drive with the slowest progress status is displayed with a progress bar 51, and time required 52 until a progress status of the complete deletion process of the slowest hard disk drive ends is displayed on the progress status display screen 50. This time required 52 is a time until the complete deletion process currently simultaneously performed with a plurality of sets is all finally completed. The user can interrupt a complete deletion process by operating a cancellation button 53.

The difference between the progress status of the complete deletion process in the hard disk drives 18 and 36 is generated by the difference in the storage capacity of the hard disk drives 18 and 36, and the difference in the transfer rate (bus speed) of buses 13 and 31. However, since the progress status will be displayed as if the complete deletion process of one set of the hard disk drive is carried out when it is seen from a user as illustrated in the progress status display screen 50, comparing with the case where it is displayed individually, the user can easily grasp the overall progress status of a complete deletion process.

Since the progress status of the slowest hard disk drive is displayed as progress status display information of the complete deletion processes that represents all the progress statuses, the remaining processing amounts until the complete deletion process of a plurality of hard disks, which proceeds at the same time, is finally completed altogether, can be exactly recognized. Since time required 52 until a complete deletion process is completed in the slowest hard disk drive is displayed on the progress status display screen 50, time until the complete deletion process of a plurality of hard disk drives 18 and 36 is finally completed can concretely be recognized.

The remaining time required 52 can be obtained by knowing the time required for deleting 1 block with the slowest hard disk drive in advance and multiplying it to the number of remaining blocks.

In case when a complete deletion process advances and a complete deletion process is completed in all the hard disk drives 18 and 36, while displaying such a progress status, (FIG. 2, STEP S108; Y), this processing is ended (end). In case where at least one complete deletion process has not been completed, it is considered that the process is in the middle of deletion (STEP S108; N), and it returns to STEP S104, and processing is continued.

In case where an error occurs with one of hard disk drives 18 and 36 in the complete deletion process (STEP S104; Y), an error notification screen including the discernment information of the hard disk drives 18 and 36 in which the error has been generated is displayed on the operation display control section 20 (STEP S109).

Figure 5:
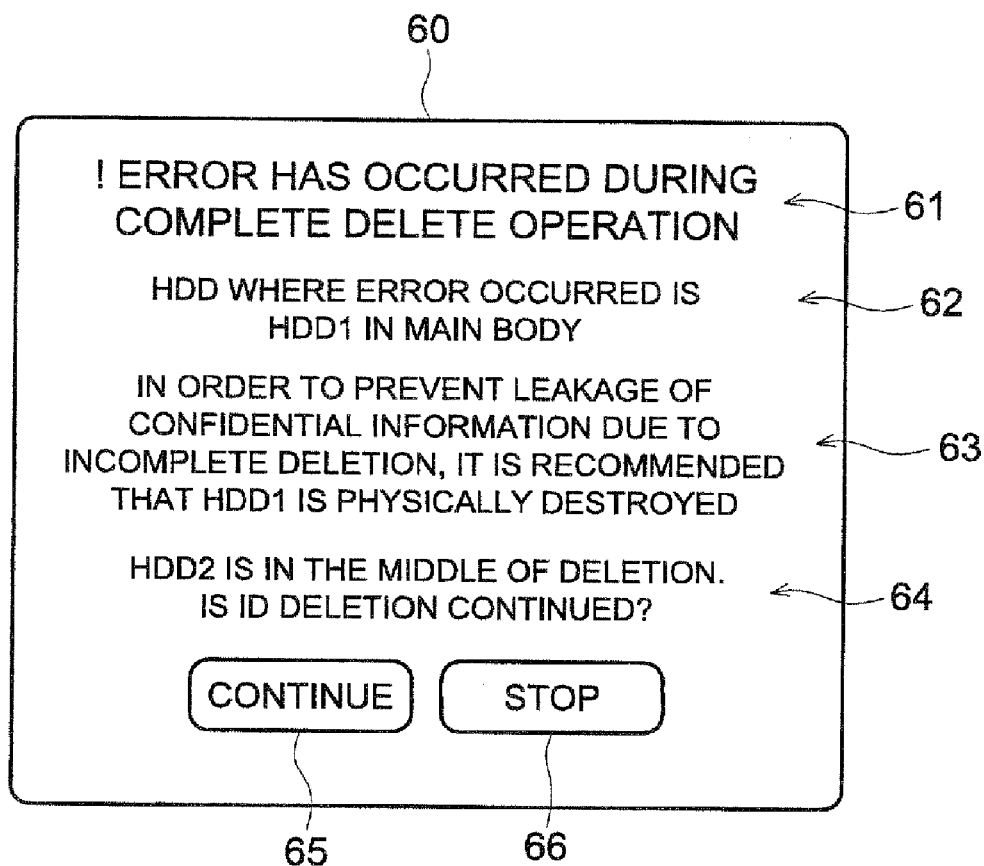
FIG. 5 is a front view illustrating an example of an error notification screen.

FIG. 5 illustrates an example of error notification screen 60 displayed on the operation display control section 20 at the time of error occurrence. An error notification screen 60 displays error message 61 for notifying that an error has been generated, display 62 for showing the discernment information (the name and number of a hard disk drive) that can specify the hard disk drive in which this error has been generated, advice message 63, which advances physical destruction of the hard disk drive in which the error produced, continuous inquiry message 64, which inquires whether the complete deletion process to the hard disk drive which has not generated an error is continued, a continuation button 65 for receiving instructions of this continuation and a stop button 66 for receiving instructions of the purport that complete deletion process needed to be finished without continuation are displayed.

According to the error notification screen 60, the user can specify and recognize the hard disk drives 18 and 36 in which the error has been generated out of a plurality of sets, and in order to prevent leakage of confidential information, the action of physically destroying the hard disk drives 18 and 36 can be taken.

In case where a stop button 66 is operated on the error notification screen 60, (STEP S110; N in FIG. 2), and this processing will be ended (end). In case where a continuation button 65 is operated (STEP S110; Y), the complete deletion process to the hard disk drives 18 and 36, in which an error has not been occurred, is continued. Namely, while monitoring error occurrence in the hard disk drive in which the complete deletion process is continued (STEP S111), the progress status of a hard disk drive in which a complete deletion process is continued is compared and the progress status (advance ratio) of the slowest hard disk drive is displayed on the progress status display screen 50 (STEP S113).

In this example, after an error occurs in one of the two hard disk drives, error occurrence in one set of the other hard disk drive under operation will be monitored (STEP S111). When an error occurs (STEP S111; Y), error notification screen 60 with respect to the hard disk drive is displayed and processing (STEP S112) is ended (end). In this case, a confirmation button (not shown) for verifying that the user has looked at, for example, the contents of the display, is displayed, while neither a continuation button 65 nor a stop button 66 is displayed, on the error notification screen 60 (when an error occurs in the last one set) instead of displaying them.

While an error does not occur (STEP S111; N), the progress status of the hard disk drive under operation is displayed on the progress status display screen 50 (STEP S113). In case where the complete deletion process of this hard disk drive has not been completed (STEP S114; N), the process returns to STEP S110, and in case where the process completes (STEP S114; Y), this processing is ended (end).

Next, operation when a complete deletion process is interrupted will be explained.

There may be a case where a user makes a mistakes in the selection of a DELETE MODE or interrupts a complete deletion process without bearing a prolonged processing (the user may push a cancellation button 53 on the progress status display screen 50).

Figure 6:
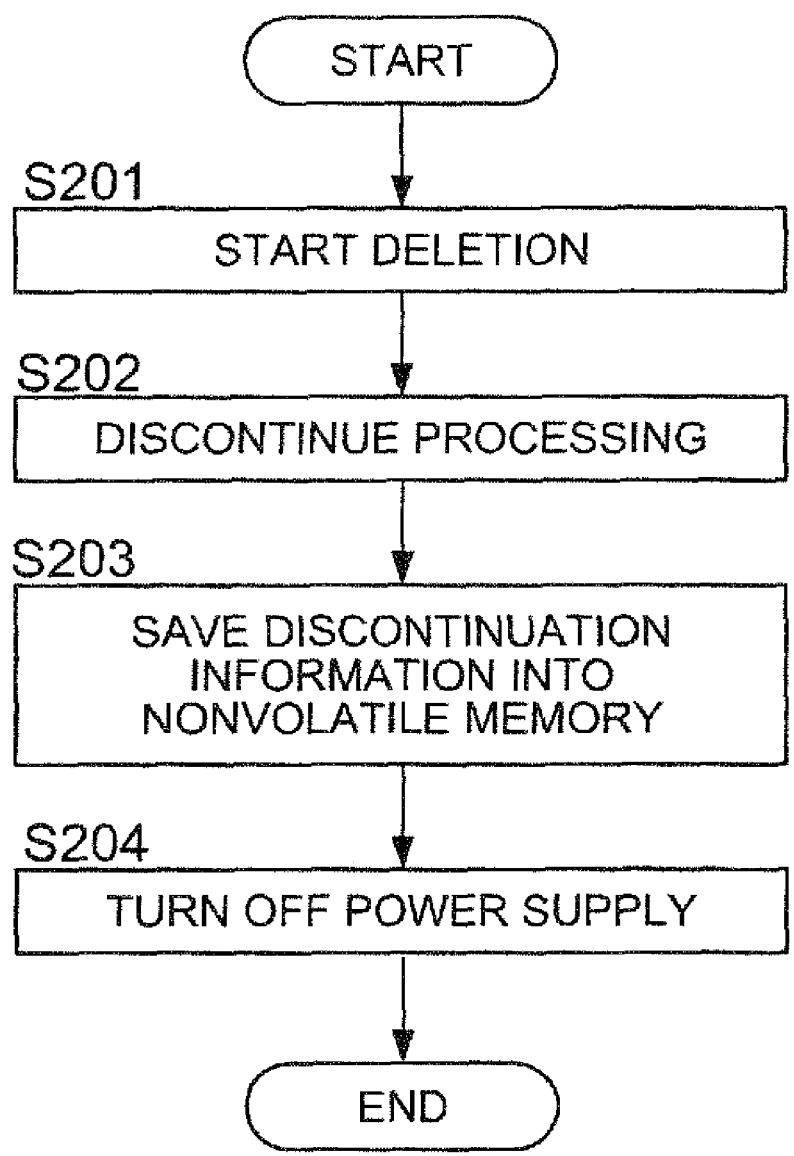
FIG. 6 is a flow chart illustrating the complete deletion process in the case of being interrupted in the middle of the process.

FIG. 6 illustrates the flow of the complete deletion process in the case of being interrupted. Deletion processing is started as well as STEPS S101, S102 and S103 of FIG. 2 (STEP S201), and a complete deletion process is executed according to the flow illustrated after STEP S104 of FIG. 2. When the cancellation button 53 on the progress status display screen 50 is pushed by the middle of the process, the complete deletion process will be interrupted at the time (STEP S202). At this time, after saving the information (discontinuation information) for making a complete deletion process resume from the interrupted point into the nonvolatile memory 17 (STEP S203), power supply is turned off and processing (STEP S204) is completed (end).

The discontinuation information will be the statuses of respective hard disk drives 18 and 36. In detail, they will be a sector number and a block number, which indicate the number showing a DELETE MODE and a resumption point. In the case of a block number, the block number to which "1" was finally set in respective management tables 40a and 40b of FIG. 3 may be sufficient, and the management tables 40a and 40b may also be memorized altogether to a nonvolatile memory 17. It also may be configured so that the management tables 40a and 40b may be created and memorized in the nonvolatile memory 17 from the beginning in preparation for discontinuation.

Even when a user suddenly and accidentally turns off a power supply or a power failure arise, if it is in the middle of a complete deletion process, the processing for saving discontinuation information into the nonvolatile memory 17 will be performed in the time period from the detection of power off to the time when a power supply actually turns off.

Figure 7:
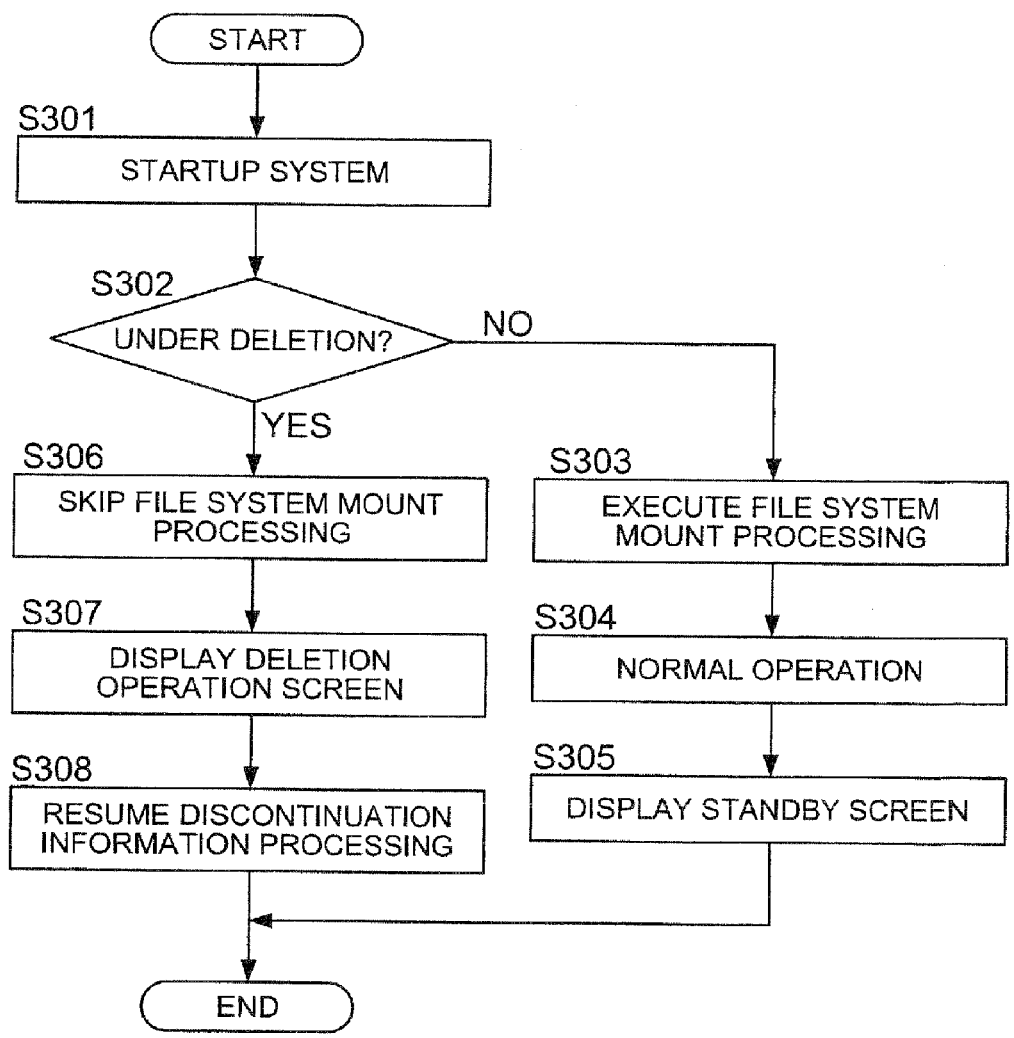
FIG. 7 is a flow chart illustrating a process at the time of turning power supply ON of the image forming apparatus.

FIG. 7 illustrates the processing at the time of power supply on of the image forming apparatus 5. After starting a system by turning the power supply on (STEP S301), the contents (existence of discontinuation information) of nonvolatile memory 17 are checked, and whether the complete deletion process to the hard disk drive 18 is in the state where it was interrupted on the middle of the deletion process (STEP S302) is determined. In case where it is not in the state where interruption occurred in the middle of the process (STEP S302; N), mount processing of a file system is performed to the hard disk drive 18 (STEP S303). Then, a normal startup operation is performed (STEP S304), and the predetermined standby screen (not shown) in which a setup and start operation with respect to a copy function are possible is displayed on the operation display control section 20 (STEP S305). Hereinafter, the image forming apparatus 5 operates in the usual state where a copy function can be used.

On the other hand, in case where the complete deletion process is interrupted on the middle of the process (STEP S302; Y), there is a high possibility that the complete deletion process of the hard disk drive 18 advances to the middle, MBR (Master Boot Record) is destroyed, and it becomes a state where partition information is unknown. Thus, the process will be skipped without performing the mount processing of a file system (STEP S306). After displaying the predetermined resumption screen for showing that a complete deletion process is resumed on operation display control section 20 (STEP S307), a complete deletion process resumes based on the discontinuation information saved at the nonvolatile memory 17 (STEP S308).

In the above-mentioned resumption screen, whether a user changes the DELETE MODE is checked. In case where it is not changed, based on the discontinuation information, the process resumes from the last discontinuation point (after resumption, continuation information will be canceled). In case where the DELETE MODE has been changed, discontinuation information is canceled and a complete deletion process is redone from the beginning by the DELETE MODE after the change.

Next, the case where a random number is overwritten and a complete deletion process is performed will be explained.

Figure 8:
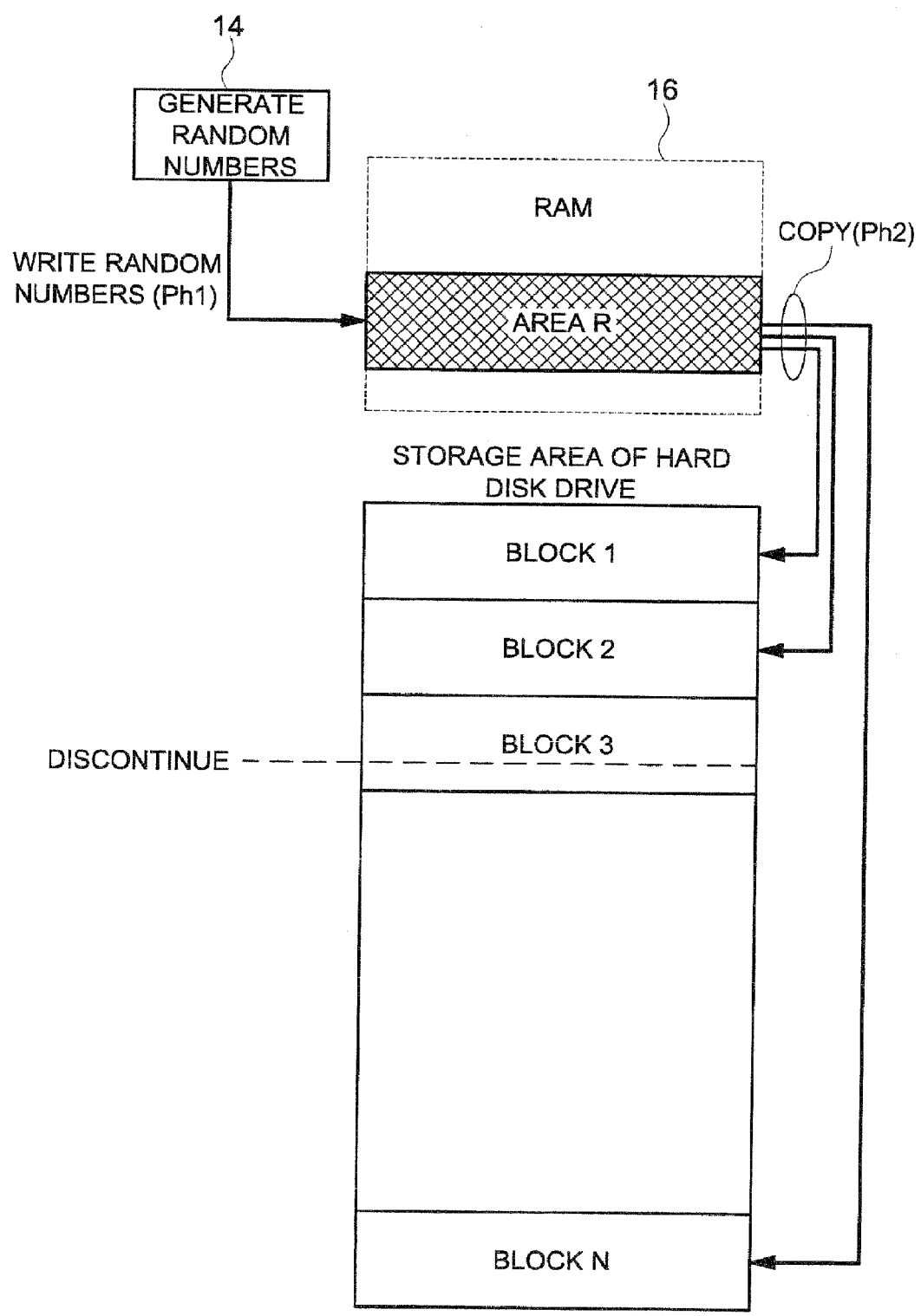
FIG. 8 is an explanatory view illustrating the data flow of the complete deletion process by a random number writing.

In case where the CPU 14 overwrites random numbers to perform a complete deletion process, as illustrated in FIG. 8, the CPU 14 generates random numbers and repeatedly writing the random number value in the RAM 16, for example, until the whole area R (example: 10 MB of continuation area) of 1 block is filled with the random numbers (FIG. 8: Ph1). Next, the CPU 14 writes a chunk of the random numbers of 1 block of the area R to all the fields of the hard disk drive 18 by successively repeating the duplicate of the chunk of the random numbers from the top of hard disk drive 18 to carry out the complete deletion by the random number (Ph2).

The image forming apparatus 5 is configured so that the CPU 14 compares the random number value of 1 block in the area R and the value in the hard disk drive block by block after completing the complete deletion process as described above. For example, in case where a complete deletion process is resumed by turning power supply off/on after the complete deletion process was interrupted while copying the contents of area R into block 3 of FIG. 8, random numbers are generated by the CPU 14 and the new random numbers of 1 block is written into area R. When this has been copied to the field after block 3, the contents of block 1 and block 2 and the contents after block 3 will not coincide, and it becomes an error by the verification after complete deletion process completion.

Then, a complete deletion process resumes according to the flow illustrated in FIG. 9. That is, the CPU 14 determines whether the point where the discontinuation occurred is after block 2 based on the discontinuation information saved in the nonvolatile memory 17 (STEP S401). In case where there is discontinuation in block 1 (STEP S401; N), all complete deletion processes are redone from the stage which generates a new random number and writes the random number of 1 block into the area R (STEP S402).

On the other hand, in case where there is discontinuation after block 2, (STEP S401; Y), the contents of block 1 are read from the hard disk drive and extends them onto the area R of RAM 16 without newly generating a random number, the contents of this area R are copied into each block after the block where discontinuation occurred and the continuation of the complete deletion process is executed (STEP S403). Thereby, although there is discontinuation in the middle of the complete deletion process using a random number, after resumption, a verification error becomes not to occur and the continuation from the middle is attained. In evacuating the random numbers of the area R to the nonvolatile memory 17 at the time of discontinuation, the field for this portion is needed in the nonvolatile memory 17. It is not necessary to secure the field of the portion in the nonvolatile memory 17 by using the random numbers which have been written into block 1.

According to a data storage apparatus of an embodiment of the present invention, since the complete deletion processes to a plurality of hard disk drives are simultaneously executed and one progress display on behalf of the progress statuses of the complete deletion processes of a plurality of hard drives is displayed, the management of progress can be efficiently performed and the complete deletion of the plurality of the hard disk drives can be easily carried out.

The display control section in an embodiment of the present invention carries out the error display of the hard disk drive, in which an error has been generated, so as to be identified, in case where an errors has occurred in the middle of the complete deletion process to a plurality of hard disk drives. With this aspect of the invention, although the progress status is displayed as if a plurality of hard disk drives operates as one drive, in case where an error occurs, the hard disk drive in which the error has occurred is identifiably displayed.

According to an embodiment of the present invention, the progress status of the hard disk drive with the lowest advance ratio of a complete deletion process is displayed in a plurality of hard disk drives. This originates from that the processing time required in order to carry out the complete deletion of a plurality of hard drives depends on the slowest hard disk drive.

According to an embodiment of the invention, the complete deletion process of the plurality of hard disk drives is simultaneously executed. Those progress statuses are displayed by one progress display representing thereof. Since it is visible to a user as well as the case where one set of a hard disk drive is under complete deletion, grasp of the progress status becomes easy.

According to an embodiment of the present invention, since generation of random numbers for 1 block is enough to execute the complete deletion process, the processing time of the complete deletion process by random numbers is shortened. Although the process resumes after discontinuation, since the same random number value used before the discontinuation is written in, the verification error caused by random number value difference used between blocks before and after the discontinuation is not produced.

According to an embodiment of the present invention, the complete deletion process of a plurality of hard disk drives controlled by different CPUs is executed simultaneously.

As mentioned above, although an embodiment of the invention has been explained by using drawings, a concrete configuration is not limited to what was illustrated in the embodiment, and although changes and the additions may be made without departing from the scope of the present invention, it will be included in the present invention.

For example, although in an embodiment, the example in which the complete deletion of two sets of the hard disk drives 18 and 36 is simultaneously executed has been described, the number of hard disk drives may be three or more sets. Although an example in which respective hard disk drives 18 and 36 are controlled by different CPUs 14 and 32 has been explained, a plurality of hard disk drives controlled by the same CPU may be set as the object of a complete deletion process. For example, a plurality of hard disk drives which stores image data for different colors may be set as an object of a complete deletion process.

The data storage apparatus may be configured so that the CPU 14 investigates the number and those capacities of the hard disk drives which should be set as the object of a complete deletion process before performing a complete deletion process, and a complete deletion process may be simultaneously performed on the hard disk drives which have been discovered.

According to an embodiment of the present invention, the progress status of the slowest hard disk drive is displayed on the progress status display screen 50. However, for example, the ratio of the sum of total deleted capacity in all the hard disk drives to the total capacity of all the hard disk drives which have been set as the object of a complete deletion process may be displayed as one progress status representing the progress status of all the hard disk drives that have been set as the object of the complete deletion process.

The data storage apparatus of a present invention should just be an apparatus which may not be limited to what is contained in image forming apparatus 5 exampled in the embodiment, but the data storage apparatus may be contained in a computer apparatus. The data storage apparatus including a plurality of hard drives, which carries out the complete deletion process, may be a data storage apparatus of the present invention.

What is claimed is:

1. A data storage apparatus having a plurality of hard disk drives, the apparatus comprising:
    a deletion control section which executes complete deletion processes of the plurality of hard disk drives simultaneously; and
    a display control section which: (i) forms progress status display information of the complete deletion processes by the deletion control section, wherein the display information represents all the progress statuses of the plurality of the hard disk drives, and (ii) displays the display information on a display section,
    wherein when an error occurs during the execution of the complete deletion processes of the plurality of hard disk drives, the display control section displays a hard disk drive in which the error has occurred.

2. The data storage apparatus according to claim 1, wherein the progress status display information indicates the progress status of a hard disk drive for which an advance ratio of the complete deletion process is lowest among the plurality of hard disk drives.

3. The data storage apparatus according to claim 1, wherein the deletion control section executes a complete deletion process of a first hard disk drive that is controlled by a first CPU and a complete deletion process of a second hard disk drive that is controlled by a second CPU simultaneously.

4. A data storage apparatus having a plurality of hard disk drives, the apparatus comprising:

a deletion control section which executes complete deletion processes of the plurality of hard disk drives simultaneously; and a display control section which: (i) forms progress status display information of the complete deletion processes by the deletion control section, wherein the display information represents all the progress statuses of the plurality of hard disk drives, and (ii) displays the display information on a display section, wherein the deletion control section executes one of the complete deletion processes by generating random numbers, writing the random numbers in an entire area of a block having a predetermined size, and then repeatedly writing a duplicate of the random numbers written in the entire area of the block, and wherein when the complete deletion process is interrupted after the deletion control section completes the writing of the random numbers corresponding to the entire area of the block to the hard disk drive, the interrupted complete deletion process restarts by writing a duplicate of the random numbers obtained by reading out a block of the hard disk drive to which the random numbers have been written.

5. An image forming apparatus comprising:
a display section;
a plurality of hard disk drives;
a deletion control section which executes complete deletion processes of the plurality of hard disk drives simultaneously; and
a display control section which: (i) forms progress status display information of the complete deletion processes by the deletion control section, wherein the display information represents all the progress statuses of the plurality of the hard disk drives, and (ii) displays the display information on a display section,
wherein when an error occurs during the execution of the complete deletion processes of the plurality of hard disk drives, the display control section displays a hard disk drive in which the error has occurred.

6. The image forming apparatus according to claim 5, wherein the progress status display information indicates the progress status of a hard disk drive for which an advance ratio of the complete deletion process is lowest among the plurality of hard drives.

7. The image forming apparatus according to claim 5, wherein the deletion control section executes a complete deletion process of a first hard disk drive that is controlled by a first CPU and a complete deletion process of a second hard disk drive that is controlled by a second CPU simultaneously.

8. The image forming apparatus according to claim 7, further comprising:
an image forming section main body which forms an image according to image data; and
a print controller which converts print data into image data,
wherein the first hard disk drive is provided in the image forming section main body, and the first hard disk drive stores the image data, and
wherein the second hard disk drive is provided in the print controller, and the print controller stores the print data.

9. An image forming apparatus comprising:
a display section;
a plurality of hard disk drives;
a deletion control section which executes complete deletion processes of the plurality of hard disk drives simultaneously; and
a display control section which: (i) forms progress status display information of the complete deletion processes by the deletion control section, wherein the display information represents all the progress statuses of the plurality of the hard disk drives, and (ii) displays the display information on a display section, wherein the deletion control section executes one of the complete deletion processes by generating random numbers, writing the random numbers in an entire area of a block having a predetermined size, and then repeatedly writing a duplicate of the random numbers written in the entire area of the block, and wherein when the complete deletion process is interrupted after the deletion control section completes the writing of the random numbers corresponding to the entire area of the block to the hard disk drive, the interrupted complete deletion process restarts by writing a duplicate of the random numbers obtained by reading out a block of the hard disk drive to which the random numbers have been written.

10. A data deletion method for an image forming apparatus which includes a plurality of hard disk drives, the method comprising:
executing complete deletion processes of the plurality of hard disk drives simultaneously;
forming progress status display information of the complete deletion processes, wherein the display information represents all the progress statuses of the plurality of the hard disk drives;
displaying the display information on a display section; and
when an error occurs during the execution of the complete deletion processes of the plurality of hard disk drives, displaying a hard disk drive in which the error has occurred.

11. The data deletion method according to claim 10, wherein the progress status display information indicates the progress status of a hard disk drive for which an advance ratio of the complete deletion process is lowest among the plurality of hard disk drives.

12. The data deletion method according to claim 10, wherein the executing the complete deletion processes includes executing a complete deletion process of a first hard disk drive that is controlled by a first CPU and a complete deletion process of a second hard disk drive that is controlled by a second CPU simultaneously.

13. The data deletion method according to claim 12, wherein the image forming apparatus includes:
an image forming section main body which forms an image according to image data; and
a print controller which converts print data into image data,
wherein the first hard disk drive is provided in the image forming section main body, and the first hard disk drive stores the image data, and
wherein the second hard disk drive is provided in the print controller, and the print controller stores the print data.

14. A data deletion method for an image forming apparatus which includes a plurality of hard disk drives, the method comprising:
executing complete deletion processes of the plurality of hard disk drives simultaneously;
forming progress status display information of the complete deletion processes, wherein the display information represents all the progress statuses of the plurality of the hard disk drives; and
displaying the display information on a display section,
wherein the executing the complete deletion processes comprises:
generating random numbers;
writing the random numbers in an entire area of a block having a predetermined size;
repeatedly writing a duplicate of the random numbers written in the entire area of the block; and when the complete deletion process is interrupted after the deletion control section completes the writing of the random numbers corresponding to the entire area of the block to the hard disk drive, restarting the interrupted complete deletion process by writing a duplicate of the random numbers obtained by reading out a block of the hard disk drive to which the random numbers have been written.

* * * * *